United States Patent
Salonen et al.

(10) Patent No.: US 6,611,675 B1
(45) Date of Patent: Aug. 26, 2003

(54) ANTENNA VERIFICATION METHOD FOR ADVANCED CLOSED LOOP MODE-ONE TRANSMITTER ANTENNA DIVERSITY

(75) Inventors: Janne Mikael Salonen, Oulu (FI); Juha Valtavaara, Oulu (FI)

(73) Assignee: Nokia Mobile Phone Ltd., Espoo (FI)

( * ) Notice: Subject to any disclaimer, the term of this patent is extended or adjusted under 35 U.S.C. 154(b) by 474 days.

(21) Appl. No.: 09/669,643

(22) Filed: Sep. 26, 2000

(51) Int. Cl.[7] .............................. H04B 7/00; H04M 1/00
(52) U.S. Cl. ...................................... 455/69; 455/562.1
(58) Field of Search .............................. 455/561, 562.1, 455/69, 422, 67.1, 67.3; 342/378, 380, 381, 383

(56) References Cited

U.S. PATENT DOCUMENTS 6,192,256 B1 * 2/2001 Whinnett .................. 455/562.1
6,373,433 B1 * 4/2002 Espax et al. ................ 342/368

* cited by examiner

*Primary Examiner*—Nguyen Vo
(74) *Attorney, Agent, or Firm*—Harrington & Smith, LLP

(57) ABSTRACT

A method for use in a wideband CDMA telecommunications system wherein the base station (BS) utilizes transmit antenna diversity. The method enables the user equipment (UE) to verify an antenna weight for one of a plurality of transmit antennas that was previously signaled by the UE to the BS, and includes steps of (a) rotating a channel estimate of a dedicated pilot channel by the complex conjugate of an estimate of a common pilot channel to form an estimate of transmission weight used by the BS; (b) quantizing the estimated transmission weight to one of the half planes of the complex plane; (c) determining a value of a feedback command that the BS received in a previous slot and using that value along with a previously determined feedback command value to verify the antenna weight/and (d) using the verified antenna weight when combining common pilot channel estimates for propagation paths from the plurality of transmit antennas.

9 Claims, 3 Drawing Sheets

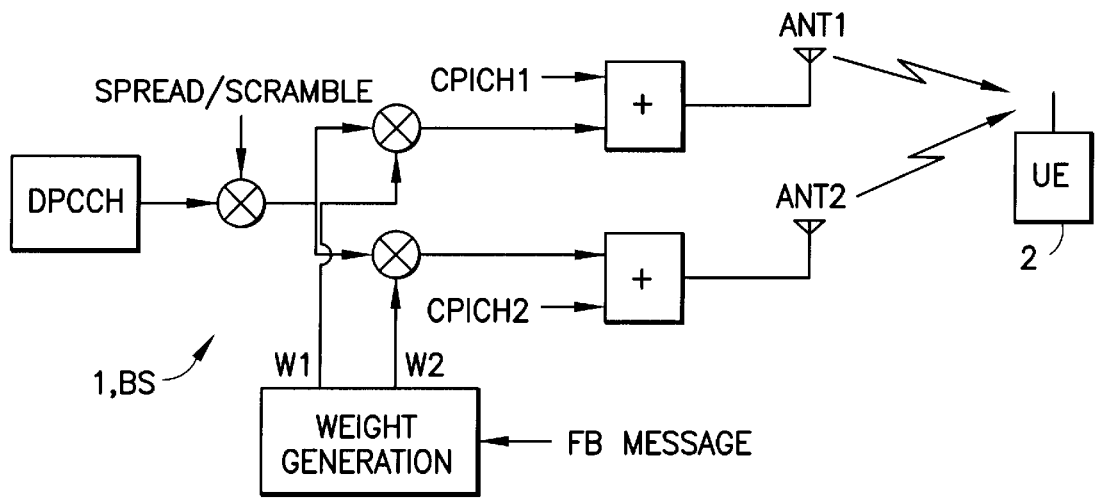
FIG. 1A
PRIOR ART
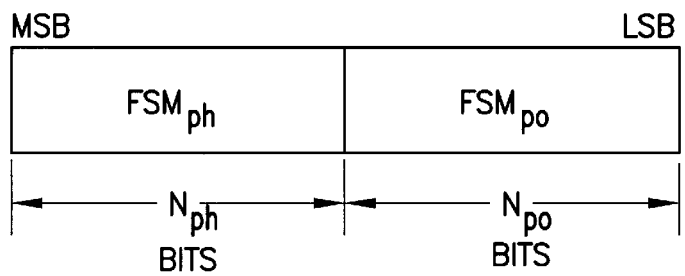
FIG. 1B
PRIOR ART
| FB MODE | $N_{FBD}$ | $N_W$ | UPDATE RATE | FEEDBACK BIT RATE | $N_{ph}$ | $N_{po}$ |
|---|---|---|---|---|---|---|
| 1 | 1 | 1 | 1500 Hz | 1500 bps | 0 | 1 |
| 2 | 1 | 4 | 1500 Hz | 1500 bps | 1 | 3 |
FIG. 1C
PRIOR ART $$M_I = \sum_{\ell=0}^{L-1} w_I \|w_i \hat{q}_l^c - \hat{q}_l^d\|$$

WHERE   $M_I$   IS FINAL COMPLEX DECISION METRIC FOR PHASE SHIFT $i$
          $w_I$   IS WEIGHT FOR PATH I (RELATIVE TO EITHER MAGNITUDE OR POWER OF THE PATH)
          $w_i$   IS ONE OF THE 4 POSSIBLE TRANSMISSION WEIGHTS FOR ANTENNA 2
          $\hat{q}_l^c$   IS COMMON PILOT CHANNEL ESTIMATE FOR PATH I
          $\hat{q}_l^d$   IS DEDICATED PILOT CHANNEL ESTIMATE FOR PATH I

FIG.2A $$M = \sum_{\ell=0}^{L-1} \hat{q}_l^{c*} \hat{q}_l^d$$

WHERE   $M_I$   IS FINAL COMPLEX DECISION METRIC
          $\hat{q}_l^{c*}$   IS COMPLEX CONJUGATE OF COMMON PILOT CHANNEL ESTIMATE FOR PATH I
          $\hat{q}_l^d$   IS DEDICATED PILOT CHANNEL ESTIMATE FOR PATH I

FIG.2B

ANTENNA VERIFICATION METHOD FOR ADVANCED CLOSED LOOP MODE-ONE TRANSMITTER ANTENNA DIVERSITY

FIELD OF THE INVENTION

This invention relates generally to wireless telecommunications equipment and systems and, more particularly, to fixed site or base station equipment that uses antenna diversity transmission techniques to mobile phones or stations, also referred to herein as user equipment (UE).

BACKGROUND OF THE INVENTION

One modern wireless telecommunications system that is presently under development is commonly referred to as a third generation (3G) wideband code division/multiple access (WCDMA) system. It is proposed in the 3G-WCDMA system to use some type of closed loop, feedback mode transmitter diversity. FIG. 1A depicts a presently proposed downlink (base station (BS) to user equipment (UE)) transmitter structure 1 for supporting closed loop transmit diversity. In FIG. 1 DPCH refers to dedicated control channel and CPICH refers to common pilot channel. The DPCH includes a (dedicated) pilot signal and data, which is channel coded and interleaved before being spread and scrambled. The DPCCH conveys the dedicated pilot and other dedicated control information. The spread complex valued signal is fed to two transmitter antenna branches (Ant1 and Ant2), and weighted with antenna-specific weight factors w1 and w2, respectively. The weight factors are complex valued signals. The weight factors (actually the corresponding phase adjustments for mode 1) are determined by the UE 2, and are signaled to the BS 1 through an uplink DPCCH. When operating in mode 2 both the phase and the amplitude is modified.

There are actually two feedback modes, which are uniquely identified by the mode specific antenna weight value set. The structure of the feedback signaling message (FSM) is shown in FIG. 1B, where it can be seen that the FSM has two parts. The first part of the FSM is $FSM_{ph}$, which transmits the phase setting, while the second part is $FSM_{po}$, which transmits the power setting. FIG. 1C is a table that summarizes the characteristics of the feedback mode, where $N_{FBD}$ is the number of feedback bits per slot, $N_w$ is the length of the feedback command in slots, update rate is the feedback command rate, $N_{po}$ is the number of power bits, and $N_{ph}$ is the number of phase bits per signaling word.

The UE 2 uses the common pilot channel CPICH to separately estimate the channels seen from each antenna (Ant1 and Ant2). Once every slot the UE 2 chooses amongst the mode-specific transmit weight set an optimum weight which, when applied at the BS 1, maximizes the received power at the UE 2. The UE 2 then feeds back tot he BS 1 the FSM, which informs the BS 1 of which power/phase settings should be used. If $N_{po}$ is zero, then equal power is applied to both transmit antennas.

In the first feedback mode equal power is applied to Ant1 and Ant2, and the UE 2 must then only determine the phase adjustment between Ant1 and Ant2. This is done using channel estimates computed from the CPICH. The BS 2 averages the phase adjustments of two consecutive slots, implying that the possible transmit weights in the feedback mode 1 are exactly the QPSK constellation points It can thus be appreciated that in the closed loop transmit diversity mode of operation the user equipment 2 determines an optimal phase shift for the BS transmission antennas (Ant1 and Ant2) and transmits a (one bit) feedback (FB) command to the BS. The BS uses two successive one bit FB commands to determine transmission weights w1 and w2 for antennas Ant1 and Ant2, respectively, when transmitting the DPCH to the UE. The weight for Ant1 (w1) is always unity, while the weight for Ant2, w2, has values of $e^{j\phi}$, where $\phi \in \{\pi/4, 3\pi/4, -\pi/4, -3\pi/4\}$.

In the proposed embodiment of FIG. 1 the BS 1 uses orthogonal common pilot patterns for the CPICH channels of antennas 1 and 2. These channels are common to all UEs 2 in the cell area, and are transmitted without UE-specific transmission weights. However, a UE 2 will typically wish to utilize CPICH channels in channel estimation due to the higher transmission power resulting in a more reliable channel estimation. In order to properly combine the channel estimates corresponding to CPICH1 and CPICH2, the UE 2 must know the transmission weight w2 that was utilized by the BS 1. A more detailed description of the mode 1 closed loop transmit diversity can be found in the 3GPP specification TS25.214:"Physical layer procedures (FDD)".

However, the feedback channel that is used to transmit the FSMs from the UE 2 to the BS 1, which are employed by the BS 1 to steer the phase shift of antenna 2, is not error free. As such, due to reception errors in the feedback channel the BS 1 may not always transmit the DPCH using the optimal phase shift determined by the UE 2. Since the UE utilizes the common pilot channels in the channel estimation it must know the value of w2, i.e., the phase shift applied at ANT2. Without this knowledge the UE 2 will combine the CPICH-based channel estimates assuming improper phase shifts for antenna 2, resulting in an incorrect channel estimate and a degradation in UE performance.

An example algorithm for the determination of the transmit antenna weight is presented in the above mentioned 3GPP specification TS25.214:"Physical layer procedures (FDD)". The proposed algorithm utilizes a priori probabilities for the transmission weights, i.e., it assumes that the phase shift corresponding to a feedback command that was sent is more probable than a transmission weight corresponding to an inverted FB command (the FB command changed by an error in the feedback channel). The algorithm determines whether it is more probable that a feedback error occurred than that a feedback error did not occur and, based on this decision, the algorithm selects the transmission weight w2 corresponding to the sequence of transmitted feedback commands, modified according to determined feedback error occurrences.

This proposed algorithm requires knowledge of the relative power levels of the dedicated and common pilot channels, as well as knowledge of the variance of the noise plus interference. However, a reliable estimation of noise variance is a computationally expensive task and is thus undesirable for execution by the UE 2. While some form of variance estimation is required, in a rapidly changing signal propagation environment the averaging times should be made short, and thus the reliability of the estimate is low. The same considerations and problems apply to the estimation of the relative power levels of the dedicated and the common pilot channels., especially when the dedicated channel power is varied by a fast power control algorithm.

It can be appreciated that problems exist in the mode 1 closed loop transmit diversity operation described above.

OBJECTS AND ADVANTAGES OF THE INVENTION

It is a first object and advantage of this invention to provide an improved technique for the user equipment to determine an estimate of w2 for use in combining channel estimates.

It is another object and advantage of this invention to provide a method for the user equipment to verify the value of w2, where the method does not require an estimation of the noise variance or the relative powers of the dedicated and common pilot channels.

It is another object and advantage of this invention to provide a method for the user equipment to verify the value of w2, where the method does not require a determination of a priori probabilities of feedback commands sent to the BS.

It is a further object and advantage of this invention to provide a simple and computationally inexpensive technique for the user equipment to verify the value of w2 by determining if the last FB bit was in error, and by computing the value of w2 in the same manner as the BS computes the value of w2.

SUMMARY OF THE INVENTION

The foregoing and other problems are overcome and the foregoing objects and advantages are realized by methods and apparatus in accordance with embodiments of this invention.

In one aspect this invention teaches a method for use in a wideband CDMA telecommunications system wherein the base station (BS) utilizes transmit antenna diversity. The method enables the user equipment (UE) to verify an antenna weight for one of a plurality of transmit antennas that was previously signaled by the UE to the BS, and includes steps of (a) rotating a channel estimate of a dedicated pilot channel by the complex conjugate of an estimate of a common pilot channel to form an estimate of transmission weight used by the BS; (b) quantizing the estimated transmission weight to one of the half planes of the complex plane; (c) determining a value of a feedback command that the BS received in a previous slot and using that value along with a previously determined feedback command value to verify the antenna weight and (d) using the verified antenna weight when combining common pilot channel estimates for propagation paths from the plurality of transmit antennas.

In another aspect this invention teaches a method for use in a transmit antenna diversity system, for enabling the UE to verify an antenna phase shift previously signaled by the UE to the BS. This method has steps of (a) computing a Euclidean distance between a channel estimate obtained from a dedicated pilot channel and a channel estimate obtained from the common pilot channel by applying an appropriate phase shift, wherein distances are computed for each channel path separately and then combined to yield a final distance metric by weighting path distances by weights proportional to either magnitudes or powers of the paths, wherein all possible phase shifts $\{\pi/4, 3\pi/4, -\pi/4, -\pi/4\}$ are investigated and a phase shift that results in the smallest distance metric is selected as a most probable phase shift; (b) using the selected phase shift to determine a latest feedback value corresponding to the transmitted phase shift; and (c) using the phase shift, computed using a plurality of feedback values, when combining common pilot channel estimates received from a plurality of transmit antennas. In the preferred embodiment the system is also a wideband CDMA system wherein the BS transmits to the UE using two antennas.

BRIEF DESCRIPTION OF THE DRAWINGS

The above set forth and other features of the invention are made more apparent in the ensuing Detailed Description of the Invention when read in conjunction with the attached Drawings, wherein:

FIG. 1A is a diagram of a proposed 3G-WCDMA base station transmitter arrangement, showing two antenna diversity and the generation of weights for phase shifting dedicated user equipment transmissions at only one of the two antennas, this Figure representing a general case wherein both of weights w1 and w2 can be changed;

FIG. 1B shows the structure of a proposed feedback signaling message (FSM);

FIG. 1C is a table that summarizes the characteristics of two proposed feedback modes of operation;

FIGS. 2A and 2B depict mathematical expressions used in two embodiments of the method of this invention;

DETAILED DESCRIPTION OF THE INVENTION

In accordance with this invention, the UE 2 computes a Euclidean distance between a channel estimate obtained from the dedicated pilot channel and a channel estimate obtained from the common pilot channel by applying an appropriate phase shift. The channel estimates considered herein assume the antenna Ant2, as there is no phase shift used for Ant1. The distances are computed for each channel path separately and then combined to yield a final distance metric by weighting path distances by weights proportional to either magnitudes or powers of the paths. All four possible phase shifts $\{\pi/4, 3\pi/4, -\pi/4, -\pi/4\}$ are investigated and the phase shift that results in the smallest distance metric is selected as the most probable phase shift. The selected phase shift is then used to determine the latest feedback bit value corresponding to the transmitted weight, and the actual phase offset used in combining the channel estimates is computed from the sequence of determined feedback bit values in a manner similar to that used by the transmitter (BS 1). In mathematical terms, the distance metric corresponding to the $i^{th}$ possible phase shift is given by the equation shown in FIG. 2A.

As was stated, the final metric is used to determine the value of the most recent FB bit corresponding to the phase shift in the current received slot. In this manner the method relies on a consideration of the errors of FB bits and uses two successive FB bits to estimate the transmitted phase shift. It is also within the scope of these teachings to directly utilize the phase shift corresponding to a minimal final metric to rotate the channel estimate obtained from CPICH2.

Figure 3:
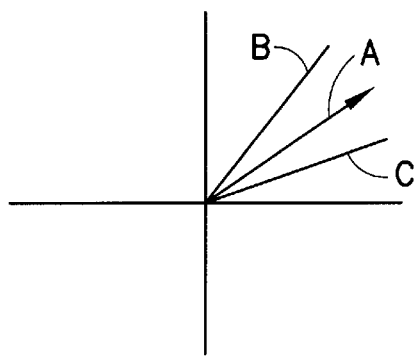
FIG. 3 shows an example of a limited decision zone for use in accepting or rejecting a dedicated pilot channel estimate.

Referring to FIG. 3, decision zones can be made narrower so that the results obtained in accordance with the foregoing method are accepted only if the metric is sufficiently small. This can be achieved, by example, by examining the phase difference between the dedicated pilot channel estimate and the rotated common pilot channel estimate, and accepting the result if the phase difference is less than some threshold value. As an example, if a dedicated pilot channel estimate is represented by the arrow A in FIG. 3, the result is accepted so long as one of the rotated common pilot channel estimates is within the sector delimited by the lines labeled B and C.

In accordance with a further embodiment of this invention, the decision metric can be computed by correlating the channel estimates obtained from the dedicated and the common pilot channels in accordance with the equation shown in FIG. 2B. This embodiment may actually be more readily implemented than the embodiment depicted in FIG. 2A, and in some respects resembles metrics of the example algorithm found in the above-referenced 3GPP specification TS25.21 4:"Physical layer procedures (FDD)". However, this embodiment ignores weighting of the metric by the ratio of the magnitudes of DPCCH and CPICH, and division of each path metric by the noise variance of the path.

Additionally, this embodiment compares the metric to zero when determining the value of the FB bit, as opposed to the prior art comparison value that was proportional to a priori probabilities based on transmitted FB bit values.

Figure 4:
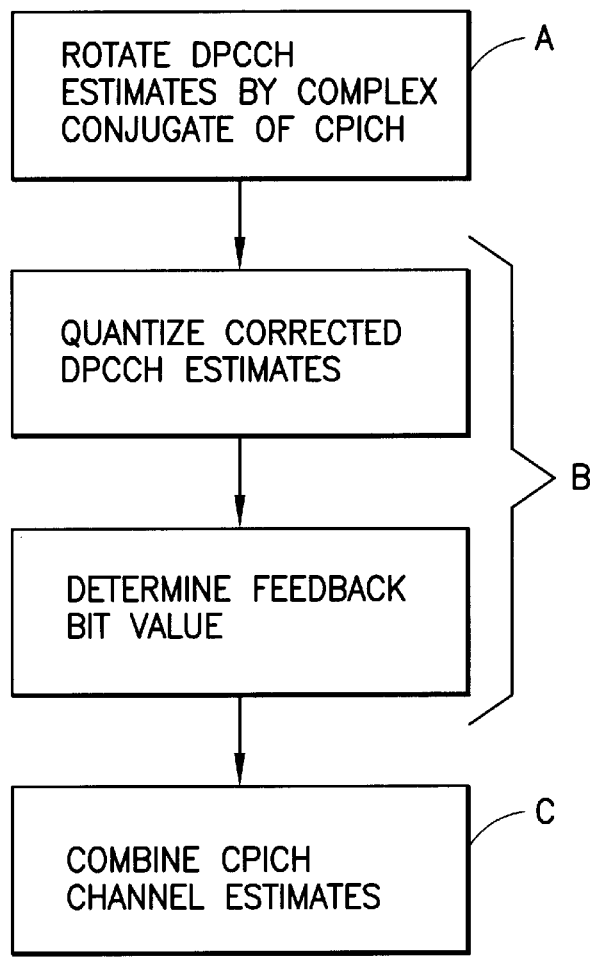
FIG. 4 is a logic flow diagram in accordance with the teachings found herein.

In essence, the embodiment shown in FIG. 2B enables the UE 2 to verify the antenna weight w2 that was previously signaled by the UE 2 to the BS 1, possibly received in error by the BS 1, and then erroneously used in the dedicated link diversity transmission of the BS 1. In this embodiment, and referring to FIG. 4, the verification of w2 is achieved by (Step A) rotating the dedicated (control) pilot channel (DPCCH) estimates by the complex conjugate of the common pilot channel estimates in order to eliminate the effect of the propagation channel and leave the effect of the rotation. At Step B the corrected DPCCH channel estimate is then quantized to one of the half planes of the complex plane from which the UE 2 is enabled to determine which feedback bit the BS 2 received one slot earlier. Based on this information, the UE 2 is then enabled to employ the knowledge of w2 when combining channel estimates determined from the common pilot channels (Step C). This knowledge is the result of estimation, and is assumed to be more reliable than the knowledge had before the verification procedure was executed.

The simplicity and lack of computational complexity made possible by the embodiments of this invention make its application especially attractive for those cases where the complexity of the antenna verification is a limiting factor. In general, the methods of antenna weight verification made possible by this invention can be used to advantage in those situations where it is desired to reduce the UE 2 processing burden.

While the invention has been particularly shown and described with respect to preferred embodiments thereof, it will be understood by those skilled in the art that changes in form and details may be made therein without departing from the scope and spirit of the invention.

What is claimed is:

1. In an antenna diversity system, a method for enabling a user equipment (UE) to verify an antenna weight previously signaled by the UE to a base station (BS), comprising steps of:

rotating a channel estimate of a dedicated pilot channel by the complex conjugate of an estimate of a common pilot channel to form an estimate of transmission weight used by the BS;

quantizing the estimated transmission weight to one of the half planes of the complex plane; and determining a value of a feedback command that the BS received in a previous slot and using that value along with a previously determined feedback command value to verify the antenna weight.

2. A method as in claim 1, and further comprising a step of using the verified antenna weight when combining common pilot channel estimates for propagation paths from a plurality of antennas.

3. A method as in claim 1, wherein the system is a wideband CDMA system wherein the BS transmits to the UE using two antennas.

4. In a wideband CDMA telecommunications system wherein a base station (BS) utilizes transmit antenna diversity, a method for enabling a user equipment (UE) to verify an antenna weight for one of a plurality of transmit antennas that was previously signaled by the UE to the BS, comprising steps of:

rotating a channel estimate of a dedicated pilot channel by the complex conjugate of an estimate of a common pilot channel to form an estimate of transmission weight used by the BS;

quantizing the estimated transmission weight to one of the half planes of the complex plane;

determining a value of a feedback command that the BS received from the UE in a previous uplink slot and using that value along with a previously determined feedback command value to verify the antenna weight; and using the verified antenna weight when combining common pilot channel estimates for propagation paths from the plurality of transmit antennas.

5. In a transmit antenna diversity system, a method for enabling a user equipment (UE) to verify an antenna phase shift previously signaled by the UE to a base station (BS), comprising steps of:

computing a Euclidean distance between a channel estimate obtained from a dedicated pilot channel and a channel estimate obtained from a common pilot channel by applying an appropriate phase shift, wherein distances are computed for each channel path separately and then combined to yield a final distance metric by weighting path distances by weights proportional to either magnitudes or powers of the paths, wherein all possible phase shifts $\{\pi/4, 3\pi/4, -\pi/4, -3\pi/4\}$ are investigated and a phase shift that results in the smallest distance metric is selected as a most probable phase shift;

using the selected phase shift to determine a latest feedback value corresponding to the transmitted phase shift; and using the phase shift determined from a plurality of feedback values when combining common pilot channel estimates received from a plurality of transmit antennas.

6. A method as in claim 5, wherein the system is a wideband CDMA system wherein the BS transmits to the UE using two antennas.

7. In a transmit antenna diversity system, a method for enabling a user equipment (UE) to estimate an antenna weight used by a base station (BS), comprising steps of:

rotating a dedicated pilot channel estimate by the complex conjugate of a common pilot channel estimate in order to eliminate the effect of a propagation channel and leave the effect of the rotation;

using a resulting dedicated pilot channel estimate to determine which feedback bit the BS received from the UE one slot earlier;

based on this information, employing knowledge of the antenna weight when combining channel estimates determined from the common pilot channel, wherein the knowledge is the result of estimation, and is assumed to be more reliable than the knowledge had before the estimation.

8. A method as in claim 7, wherein the step of using the resulting dedicated pilot channel estimate comprises a step of quantizing the resulting dedicated pilot channel estimate to one of the half planes of the complex plane from which the UE is enabled to determine which feedback bit the BS received from the UE one slot earlier.

9. A method as in claim 7, wherein the system is a wideband CDMA system wherein the BS transmits to the UE using two antennas.

* * * * *